US009769081B2

(12) United States Patent
Pais et al.

(10) Patent No.: US 9,769,081 B2
(45) Date of Patent: Sep. 19, 2017

(54) BUFFER MANAGER AND METHODS FOR MANAGING MEMORY

(71) Applicant: Marvell World Trade Ltd., St. Michael (BB)

(72) Inventors: Alon Pais, D.N. Shimshom (IL); Nafea Bishara, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/692,635

(22) Filed: Dec. 3, 2012

(65) Prior Publication Data

US 2013/0088965 A1    Apr. 11, 2013

Related U.S. Application Data

(63) Continuation of application No. 13/038,266, filed on Mar. 1, 2011, now Pat. No. 8,327,047.

(60) Provisional application No. 61/315,327, filed on Mar. 18, 2010, provisional application No. 61/347,947, filed on May 25, 2010.

(51) Int. Cl.
| | | |
|---|---|---|
| *G06F 3/00* | (2006.01) | |
| *G06F 13/00* | (2006.01) | |
| *H04L 12/863* | (2013.01) | |
| *G06F 5/12* | (2006.01) | |

(52) U.S. Cl.
CPC .............. *H04L 47/621* (2013.01); *G06F 5/12* (2013.01); *G06F 2205/106* (2013.01)

(58) Field of Classification Search
CPC ..... G06F 5/12; G06F 2205/106; H04L 47/621
See application file for complete search history.

(56) References Cited

U.S. PATENT DOCUMENTS

| | | | | |
|---|---|---|---|---|
| 4,574,351 | A | * | 3/1986 | Dang et al. ................... 710/68 |
| 4,612,612 | A | * | 9/1986 | Woffinden et al. ............. 711/3 |
| 4,682,281 | A | * | 7/1987 | Woffinden et al. .......... 711/207 |
| 5,315,707 | A | * | 5/1994 | Seaman et al. ............... 710/56 |
| 5,657,471 | A | * | 8/1997 | Lary et al. ................... 711/154 |
| 5,860,149 | A | * | 1/1999 | Fiacco et al. ............... 711/209 |
| 6,009,463 | A | * | 12/1999 | Brandt et al. ............... 709/213 |
| 6,078,993 | A | * | 6/2000 | Iwata et al. ................. 711/128 |
| 6,112,265 | A | | 8/2000 | Harriman et al. |
| 6,282,589 | B1 | * | 8/2001 | Porterfield et al. .......... 710/52 |
| 6,343,351 | B1 | * | 1/2002 | Lackman et al. ............ 711/158 |

(Continued)

FOREIGN PATENT DOCUMENTS

| | | |
|---|---|---|
| CN | 1226704 A | 8/1999 |
| CN | 1534487 A | 10/2004 |

(Continued)

OTHER PUBLICATIONS

"System-on-Chip Packet Processor for an Experimental Network Services Platform" by David Taylor. Alex Chandra. Yuhua Chen. Sarang Dharmapurikar, John Lockwood. Wenjing Tang. Jonathan Turner; Washington University in Saint Louis; GLOBECOM 2003.*

*Primary Examiner* — Jing-Yih Shyu

(57) ABSTRACT

Some of the embodiments of the present disclosure provide a method comprising managing a plurality of buffer addresses in a system-on-chip (SOC); and if a number of available buffer addresses in the SOC falls below a low threshold value, obtaining one or more buffer addresses from a memory, which is external to the SOC, to the SOC. Other embodiments are also described and claimed.

14 Claims, 6 Drawing Sheets

(56) References Cited

U.S. PATENT DOCUMENTS

| | | | |
|---|---|---|---|
| 6,378,052 B1* | 4/2002 | Genduso et al. | 711/158 |
| 6,487,640 B1 | 11/2002 | Lipasti | |
| 6,647,423 B2* | 11/2003 | Regnier et al. | 709/229 |
| 6,654,860 B1 | 11/2003 | Strongin et al. | |
| 6,918,005 B1 | 7/2005 | Marchant et al. | |
| 6,963,924 B1 | 11/2005 | Huang et al. | |
| 7,093,094 B2 | 8/2006 | Cismas | |
| 7,146,478 B2 | 12/2006 | Herkerdorf et al. | |
| 7,430,623 B2* | 9/2008 | Walls et al. | 710/52 |
| 7,600,131 B1 | 10/2009 | Krishna et al. | |
| 7,664,938 B1* | 2/2010 | Tripathi et al. | 712/220 |
| 7,813,342 B2 | 10/2010 | Gadelrab | |
| 7,818,389 B1 | 10/2010 | Chiang et al. | |
| 7,877,524 B1 | 1/2011 | Annem et al. | |
| 7,889,734 B1 | 2/2011 | Hendel et al. | |
| 7,930,451 B2* | 4/2011 | Chen et al. | 710/56 |
| 8,250,322 B2 | 8/2012 | Huang et al. | |
| 2004/0184470 A1 | 9/2004 | Holden | |
| 2004/0268044 A1 | 12/2004 | Heller, Jr. et al. | |
| 2005/0021913 A1 | 1/2005 | Heller, Jr. | |
| 2005/0100042 A1 | 5/2005 | Illikkal | |
| 2005/0193158 A1 | 9/2005 | Srinivasan et al. | |
| 2005/0198464 A1* | 9/2005 | Sokolov | 711/203 |
| 2005/0256976 A1* | 11/2005 | Susairaj et al. | 710/3 |
| 2005/0286513 A1 | 12/2005 | King | |
| 2006/0004941 A1* | 1/2006 | Shah et al. | 711/3 |
| 2006/0026342 A1 | 2/2006 | Calvignac et al. | |
| 2006/0045090 A1* | 3/2006 | Ronciak et al. | 370/392 |
| 2006/0072564 A1 | 4/2006 | Cornett et al. | |
| 2006/0179333 A1 | 8/2006 | Brittain et al. | |
| 2006/0236063 A1* | 10/2006 | Hausauer et al. | 711/170 |
| 2006/0288134 A1 | 12/2006 | Baker et al. | |
| 2007/0081538 A1* | 4/2007 | Ganji | 370/394 |
| 2007/0127485 A1 | 6/2007 | Kim et al. | |
| 2008/0005405 A1* | 1/2008 | Innis et al. | 710/56 |
| 2008/0109613 A1 | 5/2008 | Jarosh et al. | |
| 2008/0112415 A1 | 5/2008 | Sobaje | |
| 2008/0228871 A1 | 9/2008 | Sano | |
| 2008/0232374 A1 | 9/2008 | Kopelman et al. | |
| 2008/0240111 A1 | 10/2008 | Gadelrab | |
| 2008/0279208 A1* | 11/2008 | Walls et al. | 370/412 |
| 2009/0083392 A1* | 3/2009 | Wong et al. | 709/212 |
| 2009/0086733 A1 | 4/2009 | Barrack et al. | |
| 2010/0118885 A1 | 5/2010 | Congdon | |
| 2011/0072162 A1* | 3/2011 | Rysavy | 710/5 |
| 2012/0218890 A1 | 8/2012 | Gerkis | |
| 2012/0219002 A1 | 8/2012 | Sobaje | |
| 2012/0317360 A1 | 12/2012 | Zettler et al. | |
| 2012/0331227 A1 | 12/2012 | Saripalli | |
| 2014/0153575 A1 | 6/2014 | Munoz | |

FOREIGN PATENT DOCUMENTS

| | | |
|---|---|---|
| CN | 1617107 A | 5/2005 |
| CN | 1682502 A | 10/2005 |
| CN | 1922591 A | 2/2007 |
| JP | H05173953 A | 7/1993 |
| JP | H07202946 A | 8/1995 |
| JP | 2002278834 A | 9/2002 |
| JP | 2005018772 A | 1/2005 |
| JP | 2006513510 A | 4/2006 |

* cited by examiner

BUFFER MANAGER AND METHODS FOR MANAGING MEMORY

CROSS REFERENCE TO RELATED APPLICATIONS

The present disclosure is a continuation of and claims priority to U.S. patent application Ser. No. 13/038,266, filed Mar. 1, 2011, now U.S. Pat. No. 8,327,047, issued Dec. 4, 2012, which claims priority to U.S. Patent Application No. 61/315,327, filed Mar. 18, 2010, and U.S. Patent Application No. 61/347,947, filed May 25, 2010, which are incorporated herein by reference.

The present application is related to U.S. patent application Ser. No. 12/947,678, filed Nov. 16, 2010, to U.S. patent application Ser. No. 13/038,279, filed Mar. 1, 2011, and to U.S. patent application Ser. No. 13/038,258, filed Mar. 1, 2011, the entire specifications of which are hereby incorporated by reference in their entirety for all purposes, except for those sections, if any, that are inconsistent with this specification.

TECHNICAL FIELD

Embodiments of the present disclosure relate to buffers in general, and more specifically, to a buffer manager and methods for managing memories.

BACKGROUND

Unless otherwise indicated herein, the approaches described in this section are not prior art to the claims in the present disclosure and are not admitted to be prior art by inclusion in this section.

In a conventional computing system, buffer management is generally performed by a processing core. For example, the processing core allocates buffers for buffering data, and releases buffers when the buffered data is emptied from the buffers. These operations consume considerable resources of the processing core.

SUMMARY

In various embodiments, the present disclosure provides a method comprising managing a plurality of buffer addresses in a system-on-chip (SOC); and if a number of available buffer addresses in the SOC falls below a low threshold value, obtaining one or more buffer addresses from a memory, which is external to the SOC, to the SOC. Furthermore, if the number of available buffer addresses in the SOC exceeds a high threshold value, another one or more buffer addresses is allocated from the SOC to the memory. There is also provided a system-on-chip (SOC) comprising a client component; and a buffer management unit (BMU) comprising an internal buffer pointer pool (IBPP); and a controller configured to monitor a number of unassigned buffer pointers in the IBPP, and if the number of unassigned buffer pointers in the IBPP falls below a threshold value, allocate one or more buffer pointers from an external buffer pointer pool (EBPP) to the IBPP. There is also provided a method comprising maintaining a plurality of buffer pointer pools (BPPs), wherein each BPP is logically sectioned in an internal buffer pointer pool (IBPP) and an external buffer pointer pool (EBPP); and for each BPP, dynamically allocating a plurality of buffer pointers to the corresponding IBPP and dynamically allocating another plurality of buffer pointers to the corresponding EBPP.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
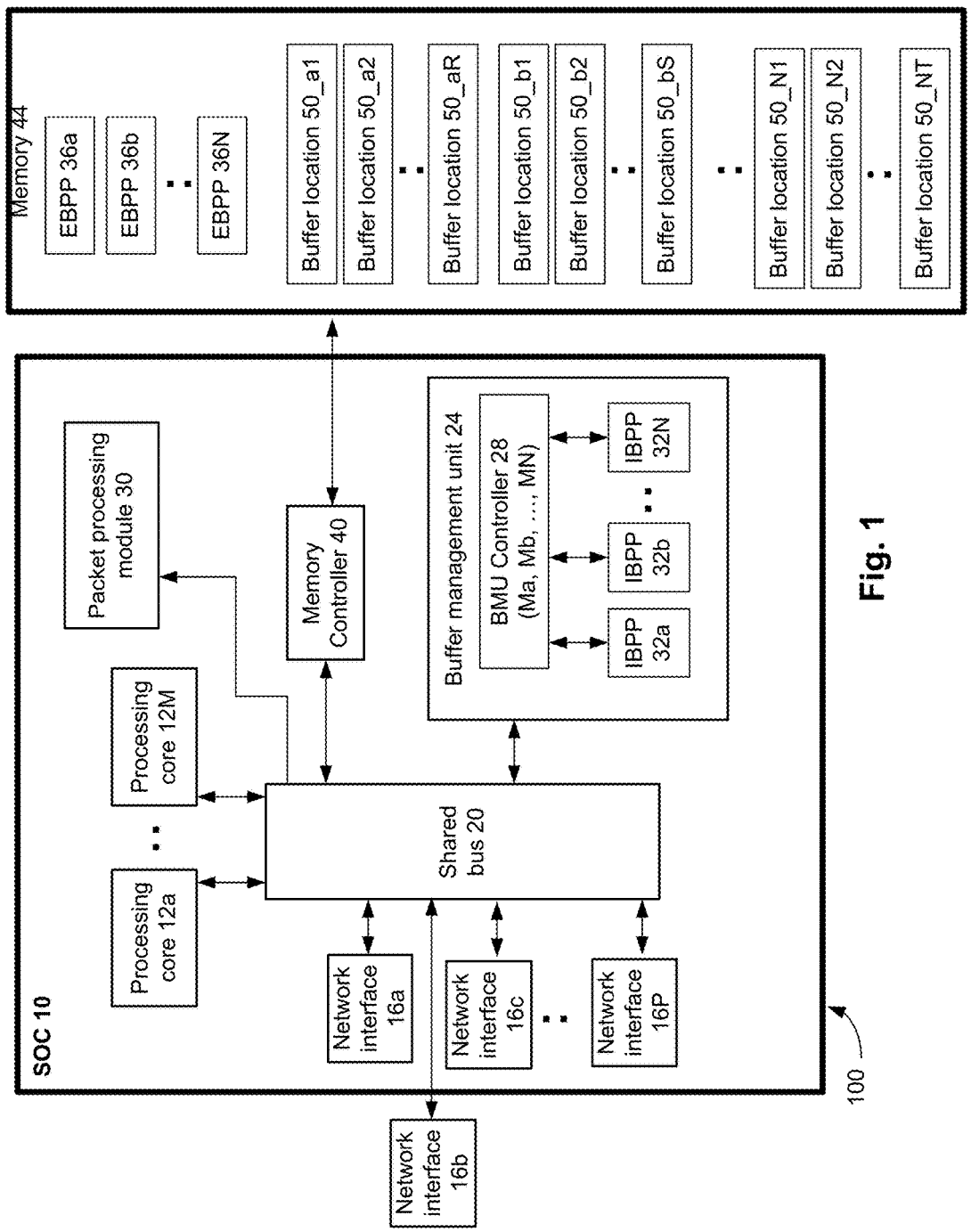
FIG. 1 schematically illustrates a packet communication system that includes a system-on-chip comprising a buffer management unit, in accordance with an embodiment of the present disclosure.

FIG. 1 schematically illustrates selected parts of a packet communication system 100 (also referred to herein as system 100) that includes a system-on-chip (SOC) 10 comprising a buffer management unit (BMU) 24, in accordance with an embodiment of the present disclosure. Additional parts of the system 100 are not shown to avoid obfuscating teachings of this disclosure. The illustrated SOC 10 also includes one or more processing cores, e.g. processing core 12a, . . . , processing core 12M, where M is an appropriate positive integer.

The system 100 includes one or more network interfaces, e.g., network interface 16a, network interface 16b, . . . , network interface 16P, where P is an appropriate positive integer. One or more of the network interfaces (e.g., network interface 16b) are external to the SOC 10, while one or more of the remaining network interfaces (e.g., network interface 16a, network interface 16c, . . . , network interface 16P) are internal to the SOC 10, as illustrated in FIG. 1. In an embodiment, network interfaces 16a, . . . , 16P are network devices, e.g., a network switch, a network router, a network port, an Ethernet port (e.g., a Gigabyte Ethernet port), a network controller, any appropriate device that has a network connectivity, and/or the like. In an embodiment, the SOC 10 is associated with a network switch or a router. For example, a network switch may be located on the SOC 10.

In an embodiment, the SOC 10 also includes a shared bus 20 that is configured to be operatively coupled to the network interfaces 16a, . . . , 16P, processing cores 12a, . . . , 12M, BMU 24, and a memory controller 40. In various other embodiments and although not illustrated in FIG. 1, instead of the shared bus 20, the SOC 10 includes a plurality of buses, e.g., a dedicated bus between two components of the SOC 10, a bus shared by a few components of the SOC 10, etc. The memory controller 40 is operatively coupled to, and configured to control a memory 44. In an embodiment, the memory controller 40 is configured to receive read and/or write instructions for the memory 44 from the one or more components (e.g., from the BMU 24, one of the processing cores and/or the network interfaces, etc.) via the shared bus 20, and translate the received instructions in a format that is acceptable to the memory 44. That is, the memory controller 40 acts as an interface between the memory 44 and various other components of the system 100 via the shared bus 20. As illustrated in FIG. 1, in an embodiment, the memory 44 is external to the SOC 10, although in other embodiments, the memory 44 is internal to the SOC 10. In an embodiment, the memory 44 is a dynamic random access memory (DRAM) (e.g., a double-data-rate three (DDR3) synchronous dynamic random access memory (SDRAM)).

Although the SOC 10 typically includes several other components (e.g., one or more peripherals, interfaces, and/or the like), these components are not illustrated in FIG. 1 for the purpose of illustrative clarity. For example, although not illustrated in FIG. 1, the SOC 10 includes various peripherals and physical layer components such as a serializer/deserializer (SERDES) module, one or more ports, a network switch, etc. In an embodiment, the SOC 10 includes various other components based on an application area of the SOC 10. In an example, the SOC 10 includes a packet processing module 30 configured to process a stream of data packets and to perform one or more packet processing functions, e.g., bridging of data packets.

In an embodiment, the memory 44 includes a plurality of buffer locations, e.g., buffer locations 50_a1, . . . , 50_aR, 50_b1, . . . , 50_bS, . . . , 50_N1, . . . , 50_NT, where R, S, T and N are appropriate positive integers. Each of the buffer locations included in the memory 44 are configured to buffer one or more bytes of data. As an example, each of the buffer locations 50_a1, . . . , 50_aR is configured to store 32 bytes of data, each of the buffer locations 50_b1, . . . , 50_bS is configured to store 256 bytes of data, each of the buffer locations 50_N1, . . . , 50_NT is configured to store 1056 bytes of data, and so on. In an embodiment, one or more of the illustrated buffer locations are contiguous buffer locations in the memory 44.

The processing core 12a, . . . , processing core 12M, network interface 16a, . . . , and/or network interface 16P (and/or one or more other components of the SOC 10, e.g., a interface controller in the SOC 10, an engine in the SOC 10, etc., not illustrated in FIG. 1) receive services from the BMU 24 (e.g., the BMU 24 allocates buffer location to one or more of these components), and accordingly, the processing core 12a, . . . , processing core 12M, network interface 16a, . . . , and/or network interface 16P (and/or any other components that receive service from the BMU 24) are also referred to herein as client components of the BMU 24. When a client component of the BMU 24 receives a data packet and the client component intends to buffer the data packet, the client component transmits an allocation request for a buffer location (also referred to herein as buffer location allocation request, or as buffer allocation request) to the BMU 24. Based on the allocation request, the BMU 24 allocates a buffer location to the client component, as will be discussed in more detail below.

In an embodiment, the BMU 24 is associated with a plurality of buffer pointer pools (BPPs), where each BPP comprises a list of buffer pointers, and where a buffer pointer is an address or a pointer of a corresponding buffer location in the memory 44. For example, although not illustrated in FIG. 1, the system 100 includes BPP_a, . . . , BPP_N, i.e., N number of BPPs. Each BPP is divided into two logical sections: an internal buffer pointer pool (IBPP) and an external buffer pointer pool (EBPP). FIG. 1 illustrates only the IBPPs and the EBPPs, but not the BPPs. As an example, BPP_a is divided into IBPP 32a and EBPP 36a, BPP_b is divided into IBPP 32b and EBPP 36b, BPP_N is divided into IBPP 32N and EBPP 36N, and so on. The IBPPs of various BPPs (i.e., IBPP 32a, IBPP 32b, . . . , IBPP 32N) are stored internally in the BMU 24, as illustrated in FIG. 1. The EBPPs of various BPPs (i.e., EBPP 36a, EBPP 36b, . . . , EBPP 36N) are stored in a location that is external to the BMU 24, e.g., to the memory 44, as illustrated in FIG. 1.

As will be discussed in more detail herein later, in an embodiment, the BMU 24 includes a BMU controller 28 that is configured to monitor, for each IBPP, a number of unassigned buffer pointers (e.g., not assigned to any client component, and is readily available for assignment to a client component) in the IBPP (e.g., IBPP 32a). For example, an unassigned buffer pointer includes a corresponding buffer address that is available for allocation. Although not illustrated in FIG. 1, in an embodiment, for each IBPP, the BMU controller 28 maintains a high threshold value and a low threshold value (although in another embodiment, the BMU controller 28 maintains a shared high threshold value and a shared low threshold value for more than one IBPP). As will be discussed in more detail herein later, for each BPP, the BMU controller 28 dynamically transfers buffer pointers between the corresponding IBPP and the corresponding EBPP, such that a number of unassigned buffer pointers in the IBPP is maintained between the corresponding low threshold value and the high threshold value. For example, if the number of unassigned buffer pointers in the IBPP falls below the low threshold value, the BMU controller 28 allocates one or more buffer pointers from the corresponding EBPP (e.g., EBPP 36a) to the IBPP 32a. On the other hand, if the number of unassigned buffer pointers in the IBPP exceeds a high threshold level, the BMU controller 28 allocates another one or more buffer pointers from the IBPP 32a to the EBPP 36a. Thus, the BMU controller 28 ensures that, for each IBPP, at least a few unassigned buffer pointers are always readily available for allocation to one or more client components (although in one embodiment, when both an IBPP and a corresponding EBPP has no remaining unassigned buffer pointers, an IBPP may not have any buffer pointers readily available for allocation). In other words, at least a few buffers that are managed locally on the SOC 10 are always readily available for allocation to a client component.

Although not illustrated in FIG. 1, in an embodiment, the EBPPs 36a, . . . , 36N are stored in a memory that is different from a memory in which the buffer locations 50_a1, . . . , 50_NT are included. For example, the EBPPs 36a, . . . , 36N and the buffer locations 50_a1, . . . , 50_NT are stored in two or more different memories. In an embodiment, one or more buffer locations can be in different memories, e.g. although not illustrated in FIG. 1, buffer location 50_a1 is in the memory 44, whereas buffer location 50_b1 can be in a memory (either internal or external to the SOC 10) that is different from the memory 44.

As previously discussed, each BPP comprises a list of buffer pointers, where a buffer pointer is an address or a pointer of a corresponding buffer location. For example, BPP_a comprises R number of buffer pointers corresponding to buffer locations 50_a1, 50_a2, . . . , 50_aR, BPP_b comprises S number of buffer pointers corresponding to buffer locations 50_b1, 50_b2, . . . , 50_bS, BPP_N comprises T number of buffer pointers corresponding to buffer locations 50_N1, 50_N2, . . . , 50_NT, and so on.

The BMU 24 includes the BMU controller 28, which is configured to dynamically allocate buffer pointers associated with a BPP from the EBPP to the IBPP and/or from the IBPP to the EBPP. In an embodiment, the BMU controller 28 stores, corresponding to each IBPP, a count M. For example, the BMU controller 28 stores counts Ma, . . . , MN corresponding to IBPPa, . . . , IBPPN. In an embodiment and as will be discussed in more detail herein later, a count corresponding to an IBPP (e.g., count Ma corresponding to IBPPa) keeps a count of unassigned buffer pointers (e.g., number of unassigned buffer pointers) in the IBPP. The BMU 24 also includes one or more other components (e.g., a transmit port, a receive port, a transmit queue, etc.), which are not illustrated in FIG. 1 for purposes of illustrative clarity.

For each BPP, the BMU 24 (and/or the processing core 12a, processing core 12b, and/or by any other appropriate component of the system 100) initially (e.g., during a startup of the system 100) allocates some of the buffer pointers of the BPP to the corresponding IBPP, and the remaining buffer pointers of the BPP to the corresponding EBPP. For example, of the R buffer pointers included in the BPP_a, R1 buffer pointers are dynamically allocated to IBPP 32a, and remaining R2 buffer pointers are allocated to the EBPP 36a.

When a client component (e.g., one of the processing cores and/or the network interfaces of FIG. 1, and/or any other appropriate component of system 100, either included in or external to the SOC 10) needs to buffer a data packet to a buffer location, the client component transmits a buffer allocation request to the BMU 24. Based on the received buffer allocation request, the BMU 24 assigns a buffer location to the client component by assigning a buffer pointer from an appropriate IBPP to the client component.

Individual buffer pointers allocated to an IBPP are added to the IBPP list. They are unassigned (e.g., not assigned to any client, and is readily available for assignment to a client component). When an unassigned buffer pointer from an IBPP (e.g., a buffer pointer from the IBPP 32a, corresponding to the buffer location 50_a2) is assigned to a client component, the buffer pointer is removed from the IBPP list, and a number of unassigned buffer pointers in the IBPP is decreased by one. Once the buffer pointer is assigned to the client component, the client component may store or write the data packet in the corresponding buffer location (e.g., in the buffer location 50_a2).

On the other hand, when contents of a buffer location (e.g., buffer location 50_a2) are read by a client component, the buffer location becomes free, i.e., available for future storage. Accordingly, the corresponding buffer pointer (which was earlier assigned to the client component) is released by the BMU 24 (i.e., the buffer pointer is added to IBPP and marked as unassigned), so that the buffer pointer is available for future assignment. That is, based on reading from a buffer location, the corresponding buffer pointer is released, which results in an increase (e.g., an increase of one) in the number of unassigned buffer pointers in the corresponding IBPP.

As previously discussed, a count corresponding to an IBPP (e.g., count Ma corresponding to IBPPa) keeps a count of unassigned buffer pointers in the IBPP. In an embodiment, when a number of unassigned buffer pointers in an IBPP decreases (e.g., decreases due to assignment of buffer pointers from the IBPP to one or more client components) beyond the corresponding low threshold value, the BMU 24 re-allocates one or more buffer pointers from the corresponding EBPP to the IBPP. For example, due to assignment of buffer pointers from the IBPP 32a to one or more client components, the number of unassigned buffer pointers in the IBPP 32a can decrease below the low threshold value. If the number of unassigned buffer pointers in the IBPP 32a decreases beyond the low threshold value, a plurality of buffer pointers is re-allocated from the corresponding EBPP (i.e., EBPP 36a) to the IBPP 32a. The plurality of re-allocated buffer pointers (e.g., 32 buffer pointers) are transmitted from the EBPP 36a to the IBPP 32a, and are stored in the IBPP 32a for possible future allocation to one or more client components. Such re-allocation of buffer pointers, from an EBPP to a corresponding IBPP, ensures that at least a few buffer pointers are always readily available in the IBPP for allocation to one or more client components (i.e., few unassigned buffer pointers are always available in the IBPP). In other words at least a few buffers that are managed locally on the SoC are always readily available for allocation to a client component.

On the other hand, due to release of buffer pointers by one or more client components, the number of unassigned buffer pointers in an IBPP can increase beyond the corresponding high threshold value. If the number of unassigned buffer pointers in an IBPP increases beyond the high threshold value, a plurality of buffer pointers is re-allocated from the IBPP to the corresponding EBPP. Such re-allocation of buffer pointers ensures that an IBPP is not overflowed with unassigned buffer pointers, and that the storage space required by all the IBPPs in the BMU 24 is relatively limited. In other words, the number of buffers that is managed locally on the SoC is limited so as to maintain ease of manageability on the SoC.

In an embodiment, the low threshold value and the high threshold value are configurable. For example, the low threshold and the high threshold values can be configured to ensure that unassigned buffer pointers are always available in the IBPPs, and to also ensure a relatively small storage space required in the SOC 10 to store the buffer pointers of the IBPPs.

Transmission of buffer pointers between an IBPP and a corresponding EBPP (e.g., during re-allocation of buffer pointers) can take place in batches of buffer pointers. For example, 32 buffer pointers are re-allocated and transmitted as a single batch from EBPP 36a to IBPP32a, or vice versa (e.g., the 32 buffer pointers are transmitted in a single transaction or as a single transmission, from the EBPP 36a to the IBPP 32a, or vice versa). In an embodiment, such batch transmission of buffer pointers (e.g., instead of separately transmitting the 32 buffer pointers) reduces the number of transactions to the memory 44, the load on bus20, the load on memory controller 40, and/or bandwidth requirement for the transmission.

In an embodiment, in some situations, one or more buffer pointers can also be assigned to one or more client components directly from an EBPP. For example, if unassigned buffer pointers in an IBPP are exhausted (e.g., exhausted rapidly due to rapid assignment of several buffer pointers to client components) before re-allocation and transmission of a batch of buffer pointers from the corresponding EBPP to the IBPP, then one or more buffer pointers can be assigned to one or more client components directly from the EBPP.

In an embodiment, the SOC 10 processes data packets received from, for example, a plurality of traffic flows originating from outside the SOC 10. Sizes of data packets, which are processed by the SOC 10, can vary considerably. In an embodiment, selection of an IBPP for assigning a buffer pointer is based at least in part on a size of a data packet that is to be buffered. For example, individual buffer locations associated with a single BPP are of similar sizes, while buffer locations associated with different BPPs are of different sizes. For example, each of the buffer locations 50_a1, . . . , 50_aR, associated with BPP_a, has 32 bytes storage capacity. On the other hand, each of the buffer locations 50_b1, . . . , 50_bS, associated with BPP_b, has 256 bytes storage capacity. Accordingly, when a client component (e.g., network interface 16a) wants to buffer a 16 byte data packet, the BMU 24 assigns a buffer pointer from IBBP 32a (i.e., assigns one of the buffer locations 50_a1, . . . , 50_aR) to the client component. However, when the client component wants to buffer a 128 byte data packet, the BMU 24 assigns a buffer pointer from IBBP 32b (i.e., assigns one of the buffer locations 50_b1, . . . , 50_bS) to the client component.

In an embodiment, for a multi-core system (such as the SOC 10), each BPP is associated with a corresponding processing core. For example, processing core 12a is assigned BPP_a (i.e., IBPP 32a assigns buffer pointers to the processing core 12a), processing core 12b is assigned BPP_b (i.e., IBPP 32b assigns buffer pointers to the processing core 12b), and so on. That is, each processing core has its own buffer area. Thus, in an embodiment, buffer pointer pool allocation is based on an origin of the data packets that are to be buffered (e.g., whether the data packets are originated from processing core 12a, processing core 12b, and/or the like).

In an embodiment, selection of an IBPP for assigning a buffer pointer can be based on any other appropriate criterion.

In an embodiment, management and/or assignment of buffer pointers by the BMU 24 requires minimal or no supervision by the processing cores 12a, . . . , 12M. That is, the use of BMU 24 relieves the processing cores from buffer management and/or assignment duties, thereby considerably saving processing power of the processing cores. In contrast, in a conventional buffer management system, generally a processing core is involved in buffer management and/or assignment.

Maintaining an IBPP and a corresponding EBPP, and assigning buffer pointers from the IBPP (e.g., instead of assigning from the EBPP) has several advantages. For example, one or more of the client components and the IBPP are all located within the SOC 10. Accordingly, an assignment of a buffer pointer from the IBPP to a client component is relatively faster compared to an assignment of a buffer pointer from the EBPP to the client component. Furthermore, maintaining the EBPP (e.g., instead of storing all the buffer pointers in the IBPPs) ensures a relatively small storage size required for storing the buffer pointers of the IBPPs (as storage in the SOC 10 is relatively limited in comparison to storage in the memory 44, which is external to the SOC 10).

In an embodiment, a descriptor associated with a buffer location includes a physical address and a virtual address of the buffer location. In an embodiment, the BMU24 assigns and/releases buffer pointers by using its physical address. In another embodiment, each buffer location (e.g. buffer location 50_a1) includes both physical and virtual address, so when the BMU24 assigns and/or releases buffer pointer, both physical and virtual address are assigned and/or released.

Figure 1A:
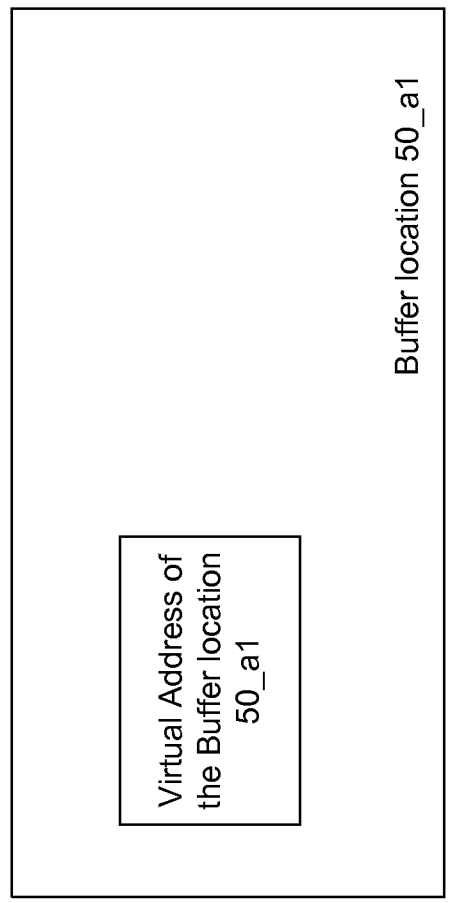
FIG. 1A schematically illustrates an example buffer location storing a virtual address of the buffer location.

Another way to handle the virtual address is to write each virtual address to the buffer itself (e.g., written during a system initialization phase). In this way the BMU 24, when allocating buffer pointers, transmits only the physical address of the buffer to the client. Then the client, if it needs the virtual address of the buffer, can read the virtual address of the buffer from the buffer itself (e.g. from the first 4 bytes of the buffer, if the virtual address is 32 bit length). For example, FIG. 1A illustrates an example buffer location 50_a1 storing the virtual address of the buffer location 50_a1.

In a conventional system, a processing core generally manages buffer assignments. As a processing core usually deals with virtual addresses, in such a conventional system, the processing core only keeps track of a virtual address of a buffer location. In contrast, the buffer locations in the system 100 are accessed by the processing cores, network interfaces, BMU 24, and/or by any appropriate client components of the BMU 24. In an example, the network interfaces and/or the BMU 24 access the buffer locations using physical addresses of the buffer locations, and the processing cores access the buffer locations using virtual addresses of the buffer locations. Accordingly, the BMU 24 maintains both the physical and virtual addresses of the buffer locations in the corresponding buffer location descriptors, thereby enabling seamless access of the buffer locations by both the processing cores and the network interfaces (and/or by any other client component of the BMU 24).

Figure 2:
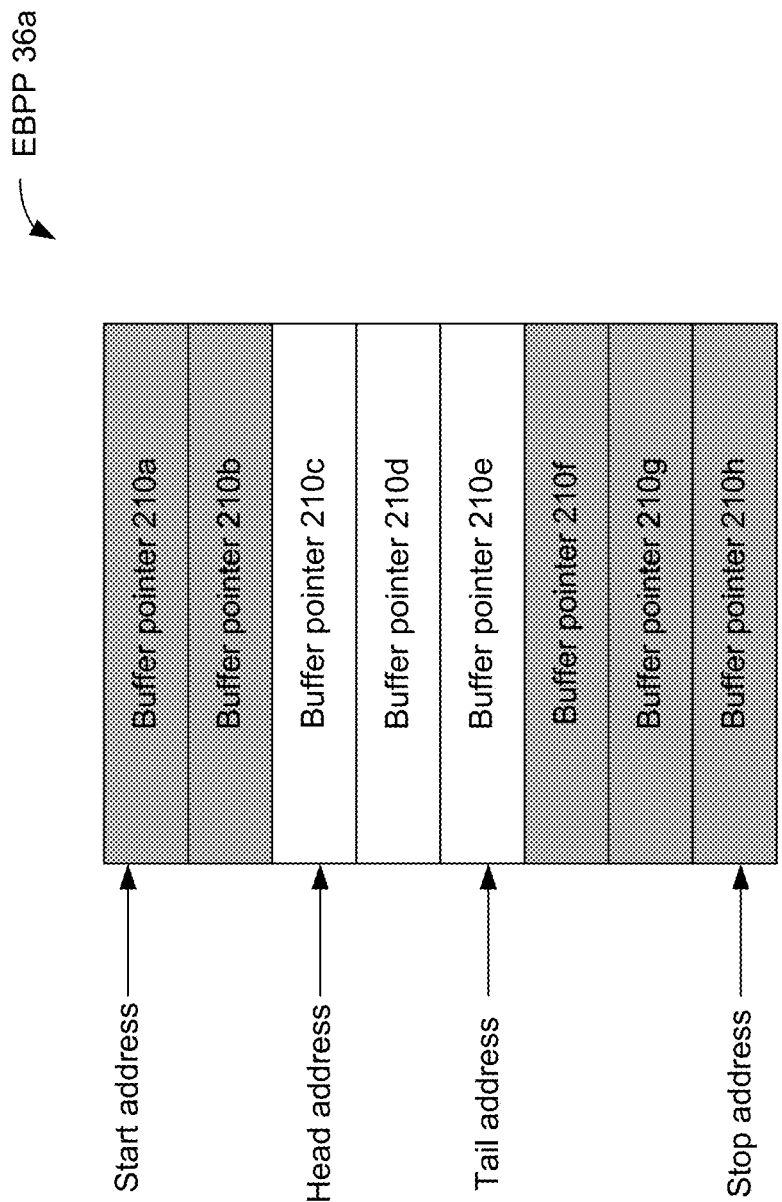
FIG. 2 schematically illustrates an example external buffer pointer pool of the packet communication system of FIG. 1, in accordance with an embodiment of the present disclosure.

FIG. 2 schematically illustrates an example EBPP (e.g., EBPP 36a) of the system 100 of FIG. 1, in accordance with an embodiment of the present disclosure. As an example, EBPP 36a includes eight buffer pointers 210a, . . . , 210h, although in other embodiments, the EBPP 36a can include any other appropriate number of buffer pointers.

The buffer pointers 210c, . . . , 210e, illustrated without any shading, are available for possible re-allocation to the IBPP 32a. The buffer pointers 210a, 210b, 210f, . . . , 210h (e.g., the buffer pointers between the head and the tail addresses) are unavailable for re-allocation (e.g., as they are not part of the buffer pointer list), and are illustrated using grey shading. Although FIG. 2 illustrates the EBPP 36a storing the buffer pointers (e.g., buffer pointers 210a, 210b, 210f, . . . , 210h) that have already been allocated to the IBPP 32a, in an embodiment, the EBPP 36a does not store these buffer pointers.

In an embodiment, the buffer pointers included in the EBPP 36a have sequential addresses. For example, an address of the buffer pointer 210b can be generated by incrementing an address of the buffer pointer 210a, an address of the buffer pointer 210c can be generated by incrementing an address of the buffer pointer 210b, and so on. A start address associated with the EBPP 36a refers to an address (e.g., a virtual address and/or a physical address) of a first buffer pointer (e.g., buffer pointer 210a) of the EBPP 36a. A stop address associated with the EBPP 36a refers to an address (e.g., a virtual address and/or a physical address) of a last buffer pointer (e.g., buffer pointer 210h) of the EBPP 36a. As buffer pointers are re-allocated from the EBPP 36a to the IBPP 32a (or vice versa) in a batch, in an embodiment, contiguous buffer pointers 210c, . . . , 210e of the EBPP 36a are available for possible re-allocation to the IBPP 32a. A head address associated with the EBPP 36a refers to an address (e.g., a virtual address and/or a physical address) of a first buffer pointer (e.g., buffer pointer 210c) of a plurality of buffer pointers (e.g., buffer pointers 210c, 210d, 210e), which are available for re-allocation to the IBPP 32a. A tail address associated with the EBPP 36a refers to an address (e.g., a virtual address and/or a physical address) of a last buffer pointer (e.g., buffer pointer 210e) of a plurality of buffer pointers (e.g., buffer pointers 210c, 210d, 210e), which are available for re-allocation to the IBPP 32a. The head and tail addresses of the EBPP 36a dynamically changes with allocation and/or re-allocation of buffer pointers between the IBPP 32a and the EBPP 36a.

In an embodiment, the BMU 24 stores the start and stop addresses, and the current head and tail addresses of the EBPP 36a. Based on these addresses, the BMU 24 is aware of a number of buffer pointers available in the EBPP 36a for possible re-allocation to the IBPP 32a. For example, a difference between a head address and a tail address is an indication of a number of buffer pointers available for re-allocation to the IBPP 32a.

Although not illustrated in FIG. 2, individual IBPPs also include corresponding start, stop, head and tail addresses. For example, a head address of an IBPP refers to an address of a first buffer pointer of a plurality of buffer pointers, which are available for assignment to a client component. Similarly, a tail address of an IBPP refers to an address of a last buffer pointer of a plurality of buffer pointers, which are available for assignment to a client component. As previously discussed, a count corresponding to an IBPP (e.g., count Ma corresponding to IBPPa) keeps a count of unassigned buffer pointer in the IBPP. For example, count Ma keeps a count of a number of unassigned buffer pointers in the IBPPa by keeping a count of buffer pointers between a head address and a tail address of the IBPPa.

Figure 3:
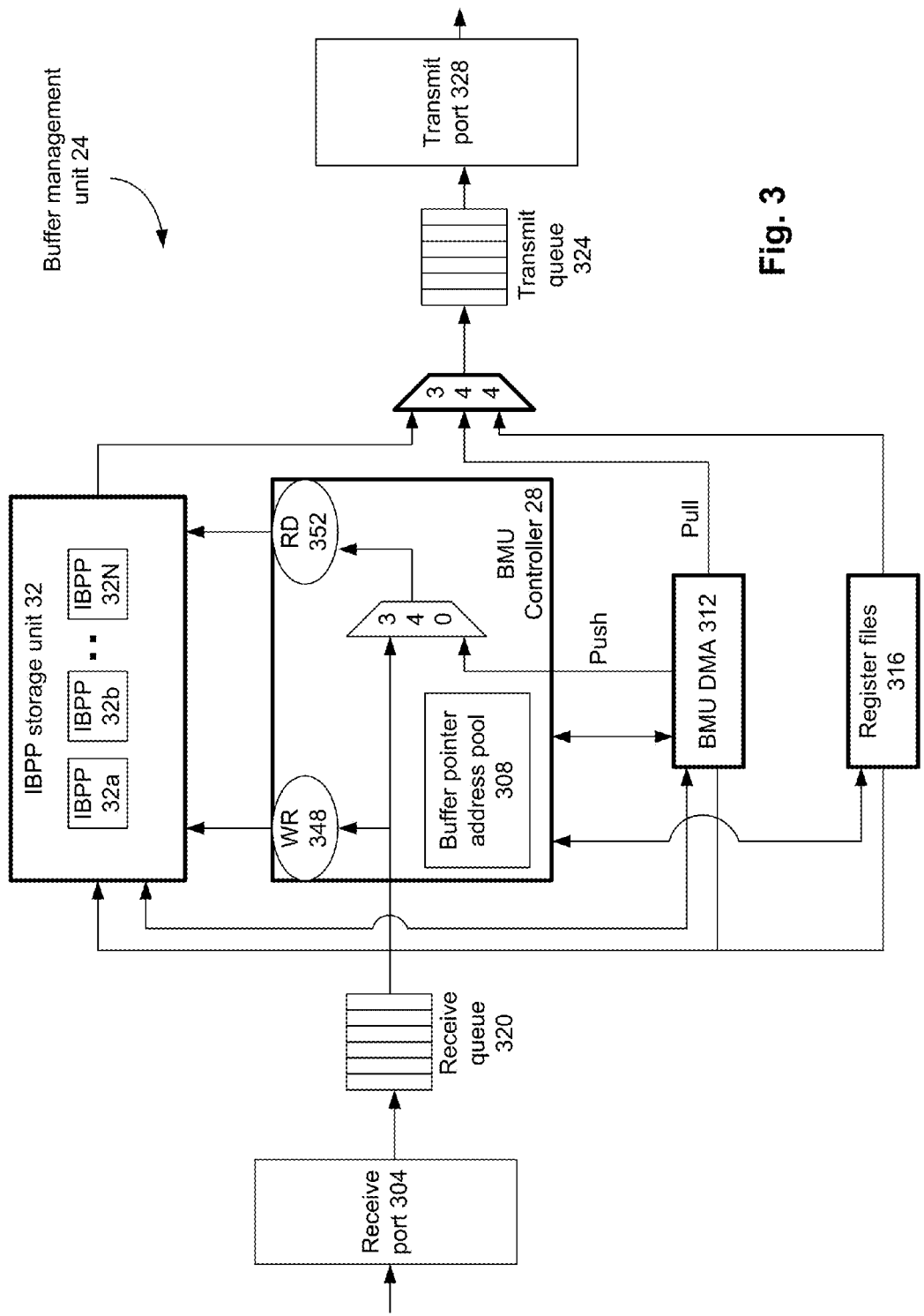
FIG. 3 schematically illustrates the buffer management unit of FIG. 1 in more detail, in accordance with an embodiment of the present disclosure.

FIG. 3 schematically illustrates the BMU 24 of FIG. 1 in more detail, in accordance with an embodiment of the present disclosure. The BMU 24 includes an IBPP storage unit 32, which stores the IBPP 32a, ..., IBPP 32N. The BMU 24 also includes the BMU controller 28, a BMU direct memory access (DMA) 312 and registers files 316.

Referring to FIGS. 1 and 3, in an embodiment the BMU 24 also includes a receive port 304, which is configured to receive data and/or instructions from one or more client components (e.g., the network interface 16c, not illustrated in FIG. 3) and/or the memory 44, via the shared bus 20. For example, the BMU 24 receives buffer allocation requests and buffer release requests from one or more client components, and also receives re-allocated buffer pointers from one or more EBPPs, as previously discussed. The BMU 24 also includes a multiplexer 344, a transmit queue 324 (e.g., a first-in first-out queue), and a transmit port 328.

Data and/or instructions received in the receive port 304 of the BMU 24 is queued in a receive queue 320 (e.g., a first-in first-out queue), and selectively transmitted to the BMU controller 28, to one of the IBPPs, to the BMU DMA 312, and/or to registers files 316.

The BMU controller 28 includes a buffer pointer address pool 308, which is configured to store start addresses, stop addresses, head addresses and/or tail addresses of various IBPPs and EBPPs. The BMU controller 28 also includes a write logic 348, a read logic 352, and a multiplexer 340.

In an embodiment, the BMU controller 28 keeps track of unassigned buffer pointers in each of the IBPPs and EBPPs, e.g., by monitoring various addresses in the buffer pointer address pool 308. Based on comparing a number of unassigned buffer pointers in an IBPP with the previously discussed high and low thresholds, the BMU controller 28 determines if buffer pointers are to be re-allocated, either from the IBPP to a corresponding EBPP, or from the EBPP to the IBPP. In the case of such re-allocation of the buffer pointers from the EBPP to the IBPP, the BMU DMA 312 transmits a pull request to the EBPP, via the multiplexer 344, the transmit queue 324, and the transmit port 328.

If buffer pointers are to be re-allocated from an IBPP to a corresponding EBPP, the BMU DMA 312 transmits a push request (e.g., to facilitate re-allocation of buffer pointers from an IBPP to a corresponding EBPP) to the IBPP, via the multiplexer 340 and the read logic 352. Based on receiving the push request, the IBPP transmits the re-allocated buffer pointers, via multiplexer 344, transmit queue 324, and the transmit port 328, to the corresponding EBPP in the memory 44. The multiplexer 344 selectively multiplexes inputs from the IBPP storage unit 32, the BMU DMA 312 and the register files 316 based on, for example, when the input from one of these components are enabled.

When the BMU controller 28 receives a buffer allocation request, the BMU controller 28 selects an appropriate BPP based on, for example, a size of a data packet that is to be buffered, the client component from which the request is received, numbers of unassigned buffer pointers available in various IBPPs, and/or the like. The IBPP corresponding to the selected BPP receives the allocation request via the multiplexer 340 and the read logic 352, and transmits the allocated buffer pointer to the client component via multiplexer 344, transmit queue 324, and the transmit port 328.

When the BMU controller 28 receives a buffer release request, the corresponding IBPP (e.g., the IBPP whose buffer pointer is to be released) receives the release request via the write logic 348 (e.g., which transmits the release request to the IBPP storage unit 32), and releases the buffer pointer by writing the buffer pointer to the IBPP list.

The register files 316 are configured to store various configuration information associated with the BMU 24. In an example, the register files 316 communicates with the BMU controller 28, receives information that are received by one or more other components of the BMU 24, and periodically updates various configuration information stored in the register files 316.

Figure 4:
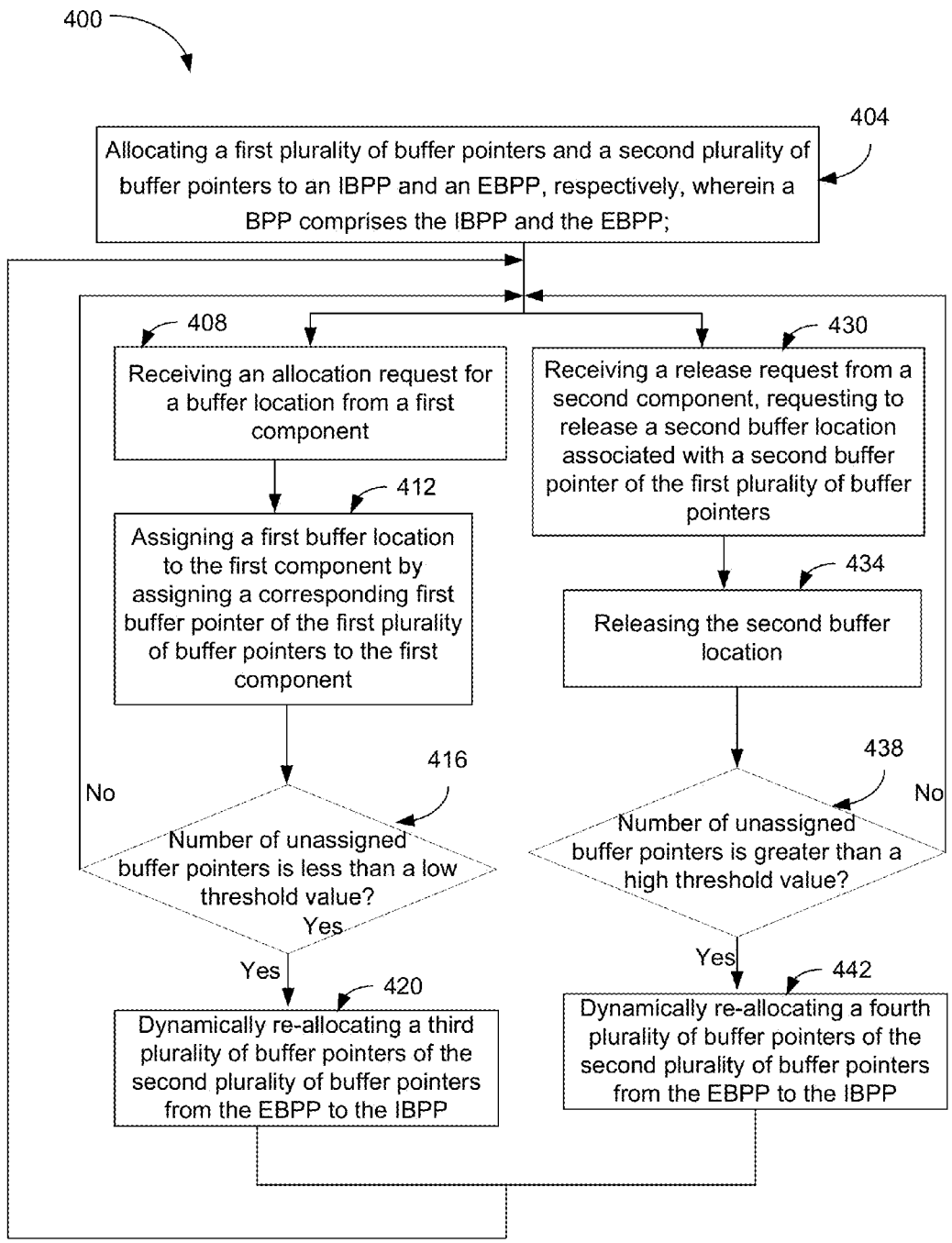
FIG. 4 illustrates an example method for operating the packet communication system of FIGS. 1 and 3, in accordance with an embodiment of the present disclosure.

FIG. 4 illustrates an example method 400 for operating the system 100 of FIGS. 1 and 3, in accordance with an embodiment of the present disclosure. At 404, the BMU 24 (e.g., the BMU controller 28) allocates (e.g., allocates a first plurality of buffer pointers and a second plurality of buffer pointers to an IBPP (e.g., IBPP 32a) and an EBPP (e.g., EBPP 36a), respectively, where a BPP (e.g., BPP_a) comprises the IBPP and the EBPP.

Subsequent to such an allocation, the BMU 24 receives either an allocation request at 408, or a release request at 430. For example, at 408, the BMU 24 receives an allocation request for a buffer location from a first component (e.g., from the network interface 16a). At 412, the BMU 24 assigns a first buffer location to the first component by assigning a corresponding first buffer pointer of the first plurality of buffer pointers from the IBPP 32a to the first component. In an embodiment, the BMU 24 deletes the first buffer pointer from the unassigned buffer pointer list, in response to assigning the first buffer location.

At 416, the BMU 24 determines whether a number of unassigned buffer pointers in the IBPP 32a is less than a low threshold value. If the number of unassigned buffer pointers is not less than the low threshold value (i.e., no at 416), the method loops back to one of the operations at 408 or 430. On the other hand, if the number of unassigned buffer pointers is less than the low threshold value (i.e., yes at 416), at 420 the BMU 24 dynamically re-allocates a third plurality of buffer pointers of the second plurality of buffer pointers from the EBPP 36*a* to the IBPP 32*a* (e.g., re-allocates a plurality of buffer pointers from the EBPP 36*a* to the IBPP 32*a*). Subsequent to 420, the method loops back to one of the operations at 408 or 430.

Referring again to operations at 430, the BMU 24 receives the release request from a second component (e.g., processing core 12*a*), requesting to release a second buffer location associated with a second buffer pointer of the first plurality of buffer pointers. In an example, the second buffer location was previously assigned by the BMU 24 to the second component. At 434, the BMU 24 releases the second buffer location, and marks the second buffer pointer as unassigned. At 438, the BMU 24 determines whether a number of unassigned buffer pointers in the IBBP 32*a* is greater than a high threshold value. If the number of unassigned buffer pointers in the IBBP 32*a* is not greater than the high threshold value (i.e., no at 438), the method loops back to one of the operations at 408 or 430. If, on the other hand, the number of unassigned buffer pointers in the IBBP 32*a* is greater than the high threshold value (i.e., yes at 438), at 442 the BMU 24 dynamically re-allocates a fourth plurality of buffer pointers of the second plurality of buffer pointers from the IBPP 32*a* to the EBPP 36*a* (e.g., re-allocates a plurality of buffer pointers from the IBPP 32*a* to the EBPP 36*a*). Subsequent to 442, the method loops back to one of the operations at 408 or 430.

Figure 5:
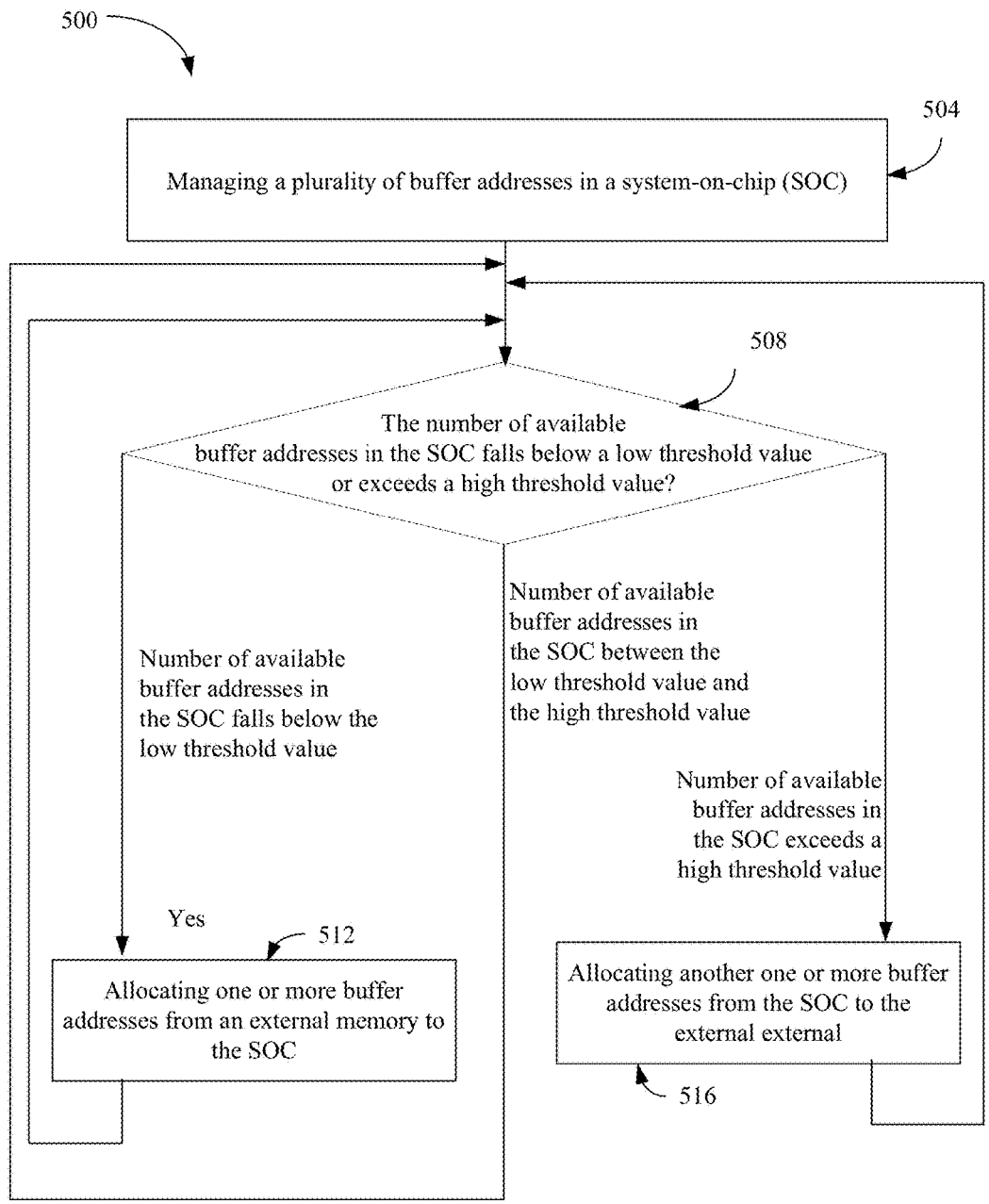
FIG. 5 illustrates another example method for operating the packet communication system of FIGS. 1 and 3, in accordance with an embodiment of the present disclosure.

FIG. 5 illustrates another example method 500 for operating the packet communication system of FIGS. 1 and 3, in accordance with an embodiment of the present disclosure. Referring to FIGS. 1, 3 and 5, at 504, the BMU controller 28 manages a plurality of buffer addresses in an SOC (e.g., manages a corresponding plurality of buffer pointers in an internal buffer pointer pool (e.g., IBPP 32*a*) of the SOC 10). At 508, the BMU controller 28 determines if the number of available buffer addresses in the SOC (e.g., if the number of unassigned buffer pointers in the internal buffer pointer pool) falls below a low threshold value or exceeds a high threshold value. If, at 508, the number of available buffer addresses in the SOC falls below the low threshold value, then at 512 the BMU controller 28 allocates one or more buffer addresses from an external memory (e.g., from an external buffer pointer pool, e.g., EBPP 36*a* in the memory 44) to the SOC (e.g., to the IBPP 32*a*), and then continues the monitoring at 504. On the other hand, if, at 508, the number of available buffer addresses in the SOC exceeds the high threshold value, then at 516 the BMU controller 28 allocates another one or more buffer addresses from the SOC to the external memory, and then continues the monitoring at 504. Furthermore, if, at 508, the number of available buffer addresses in the SOC is between the low threshold value and the high threshold value, the method continues the monitoring at 504.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A system comprising:
   a network interface configured to receive data from a computer network;
   a memory including a plurality of buffer locations, each buffer location of the plurality of buffer locations being identified by both a respective physical address and a respective virtual address, the virtual address of each buffer location being different from but corresponding to the respective physical address, each buffer location of the plurality of buffer locations being configured to store both (i) a respective buffered data from data received over the network interface and (ii) the respective virtual address that is used to identify the respective buffer location;
   a processor unit configured to access buffered data stored in a respective buffer location using the respective virtual address that is used to identify the buffer location;
   one or more client components, that are different from the processor unit, configured to access the buffered data stored in the respective buffer location using the respective physical address that is used to identify the buffer location, instead of using the respective virtual address that is used to identify the buffer location;
   a buffer management unit comprising:
      a first internal buffer pointer pool;
      a second internal buffer pointer pool; and
      a controller configured to:
         monitor a number of unassigned buffer pointers in the internal buffer pointer pool,
         in response to the number of unassigned buffer pointers in the internal buffer pointer pool falling below a low threshold value, allocate a first one or more buffer pointers from a first external buffer pointer pool to the first internal buffer pointer pool, ones of the first one or more buffer pointers pointing to a corresponding buffer location of the plurality of buffer locations,
         monitor a number of unassigned buffer pointers in the second internal buffer pointer pool, and
         in response to the number of unassigned buffer pointers in the second internal buffer pointer pool falling below another low threshold value, allocate a second one or more buffer pointers from a second external buffer pointer pool to the second internal buffer pointer pool, ones of the second one or more buffer pointers pointing to a corresponding buffer location of the plurality of buffer locations.

2. The system of claim 1, wherein the one or more client components are further configured to:
   access a virtual address of a buffer location by (i) accessing the buffered data stored in the buffer location using the physical address that is used to identify the buffer location and (ii) identifying the virtual address of the buffer location from the accessed buffered data, the accessed buffered data comprising virtual address of the buffer location.

3. The system of claim 1, wherein the controller is further configured to:
   in response to the number of unassigned buffer pointers in the first internal buffer pointer pool exceeding a high threshold value, allocate a third one or more buffer pointers from the first internal buffer pointer pool to the first external buffer pointer pool.

4. The system of claim 3, wherein the controller is further configured to:
in response to the number of unassigned buffer pointers in the second internal buffer pointer pool exceeding another high threshold value, allocate a fourth one or more buffer pointers from the second internal buffer pointer pool to the second external buffer pointer pool.

5. The system of claim 4, wherein:
the one or more client components comprises at least two client components; and
the first internal buffer pointer pool is associated with a first traffic flow originating from a first client component of the at least two client components, such that available buffer pointers from the first internal buffer pointer pool are assigned to data packets of the first traffic flow; and
the second internal buffer pointer pool is associated with a second traffic flow originating from a second client component of the at least two client components, such that available buffer pointers from the second internal buffer pointer pool are assigned to data packets of the second traffic flow.

6. The system of claim 1, wherein:
the processor unit and the one or more client components are configured as a system on a chip; and
the memory is external to the system on a chip.

7. The system of claim 1, wherein:
the processor unit, the memory and the one or more client components are configured as a system on a chip.

8. The system of claim 1, wherein one of the one or more client components comprises the network interface.

9. The system of claim 1, wherein:
each of the plurality of buffer locations is associated with a corresponding descriptor of a plurality of descriptors; and
a descriptor associated with a buffer location of the plurality of buffer locations includes the respective physical address and the respective virtual address of the corresponding buffer location.

10. A method comprising:
storing, in ones of a plurality of buffer locations, both (i) a respective buffered data and (ii) a respective virtual address, the virtual address being different from but corresponding to the physical address that is associated with the respective buffer location, wherein the buffered data is received over a network interface;
identifying ones of the plurality of buffer locations using both (i) a respective physical address associated with the buffer location and (ii) the respective virtual address associated with the buffer location;
accessing, by a processor unit, buffered data stored in a respective buffer location using the respective virtual address associated with the buffer location;
accessing, by a client component that is different from the processor unit, buffered data stored in the respective buffer location using the respective physical address associated with the buffer location, instead of using the respective virtual address associated with the buffer location; and
managing first and second internal buffer pointer pools, wherein managing the first and second internal buffer pointer pools comprises:
monitoring a number of unassigned buffer pointers in the first internal buffer pointer pool;
in response to the number of unassigned buffer pointers in the first internal buffer pointer pool falling below a low threshold value, allocating a first one or more buffer pointers from a first external buffer pointer pool to the first internal buffer pointer pool, ones of the first one or more buffer pointers pointing to a corresponding buffer location of the plurality of buffer locations;
monitoring a number of unassigned buffer pointers in the second internal buffer pointer pool; and
in response to the number of unassigned buffer pointers in the second internal buffer pointer pool falling below another low threshold value, allocating a second one or more buffer pointers from a second external buffer pointer pool to the second internal buffer pointer pool, ones of the second one or more buffer pointers pointing to a corresponding buffer location of the plurality of buffer locations.

11. The method of claim 10, further comprising:
accessing, by the client component, a virtual address of a buffer location by (i) accessing the buffered data stored in the buffer location using the physical address associated with the buffer location and (ii) identifying the virtual address of the buffer location from the accessed buffered data.

12. The method of claim 10, wherein managing the first internal buffer pointer pool further comprises:
in response to the number of unassigned buffer pointers in the first internal buffer pointer pool exceeding a high threshold value, allocating a third one or more buffer pointers from the first internal buffer pointer pool to the first external buffer pointer pool.

13. The method of claim 12, wherein managing the second internal buffer pointer pool further comprises:
in response to the number of unassigned buffer pointers in the second internal buffer pointer pool exceeding another high threshold value, allocating a fourth one or more buffer pointers from the second internal buffer pointer pool to the second external buffer pointer pool.

14. The method of claim 13, wherein the client component is a first client component, the method further comprising:
associating the first internal buffer pointer pool with a first traffic flow originating from the first client component, such that available buffer pointers from the first internal buffer pointer pool are assigned to data packets of the first traffic flow; and
associating the second internal buffer pointer pool with a second traffic flow originating from a second client component, such that available buffer pointers from the second internal buffer pointer pool are assigned to data packets of the second traffic flow.

\* \* \* \* \*